United States Patent
Tonouchi (10) Patent No.: US 9,507,552 B2
(45) Date of Patent: Nov. 29, 2016

(54) PRINTING CONTROL APPARATUS, PRINTING CONTROL SYSTEM, PRINTING CONTROL METHOD, AND NON-TRANSITORY COMPUTER READABLE MEDIUM

(71) Applicant: FUJI XEROX CO., LTD., Tokyo (JP)

(72) Inventor: Masaharu Tonouchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/832,107

(22) Filed: Aug. 21, 2015

(65) Prior Publication Data

US 2016/0266854 A1    Sep. 15, 2016

(30) Foreign Application Priority Data

Mar. 11, 2015   (JP) ................................ 2015-048129

(51) Int. Cl.
  *G06F 3/12*   (2006.01)
  *G06K 15/02*  (2006.01)
(52) U.S. Cl.
  CPC ........... *G06F 3/1251* (2013.01); *G06F 3/1219* (2013.01); *G06F 3/1253* (2013.01); *G06F 3/1294* (2013.01); *G06K 15/022* (2013.01); *G06K 15/1817* (2013.01)
(58) Field of Classification Search
  CPC combination set(s) only.
  See application file for complete search history.

(56) References Cited

U.S. PATENT DOCUMENTS

| | | | | |
|---|---|---|---|---|
| 2007/0065199 A1* | 3/2007 | Matsuduki | ............ | B41J 15/046 399/384 |
| 2011/0032577 A1* | 2/2011 | Gocho | ........................ | B41J 3/60 358/304 |
| 2011/0176851 A1* | 7/2011 | Kuwana | ................... | B41J 3/546 400/582 |
| 2011/0222089 A1* | 9/2011 | Kikuchi | ..................... | B41J 3/60 358/1.12 |
| 2011/0236111 A1* | 9/2011 | Fujii | .................... | G03G 15/238 400/583 |
| 2015/0338810 A1* | 11/2015 | Matsui | ............... | G03G 15/5062 399/16 |

FOREIGN PATENT DOCUMENTS

| | | |
|---|---|---|
| JP | 05-000557 A | 1/1993 |
| JP | 11-240211 A | 9/1999 |
| JP | 2005-335256 A | 12/2005 |

* cited by examiner

*Primary Examiner* — Jerome Grant, II
(74) *Attorney, Agent, or Firm* — Sughrue Mion, PLLC (57) ABSTRACT

A printing control apparatus includes a setting unit that sets a location of a delimitation in a print instruction, a buffer unit that buffers image data generated in response to the print instruction, and a transfer unit that transfers the image data buffered on the buffer unit to a printer that prints on a continuous-feed paper sheet. The transfer unit inserts blank sheet data at the location of the delimitation set by the setting unit when an amount of the image data buffered by the buffer unit becomes equal to or below a first threshold value and transfers the image data to the printer.

18 Claims, 11 Drawing Sheets

PRINTING CONTROL APPARATUS, PRINTING CONTROL SYSTEM, PRINTING CONTROL METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-048129 filed Mar. 11, 2015.

BACKGROUND

Technical Field

The present invention relates to a printing control apparatus, a printing control system, a printing control method, and a non-transitory computer readable medium.

SUMMARY

According to an aspect of the invention, there is provided a printing control apparatus including a setting unit that sets a location of a delimitation in a print instruction, a buffer unit that buffers image data generated in response to the print instruction, and a transfer unit that transfers the image data buffered on the buffer unit to a printer that prints on a continuous-feed paper sheet. The transfer unit inserts blank sheet data at the location of the delimitation set by the setting unit when an amount of the image data buffered by the buffer unit becomes equal to or below a first threshold value and transfers the image data to the printer.

BRIEF DESCRIPTION OF THE DRAWINGS

Exemplary embodiments of the present invention will be described in detail based on the following figures, wherein.

DETAILED DESCRIPTION

Exemplary embodiments of the present invention are described with reference to the drawings.

First Exemplary Embodiment

Figure 1:
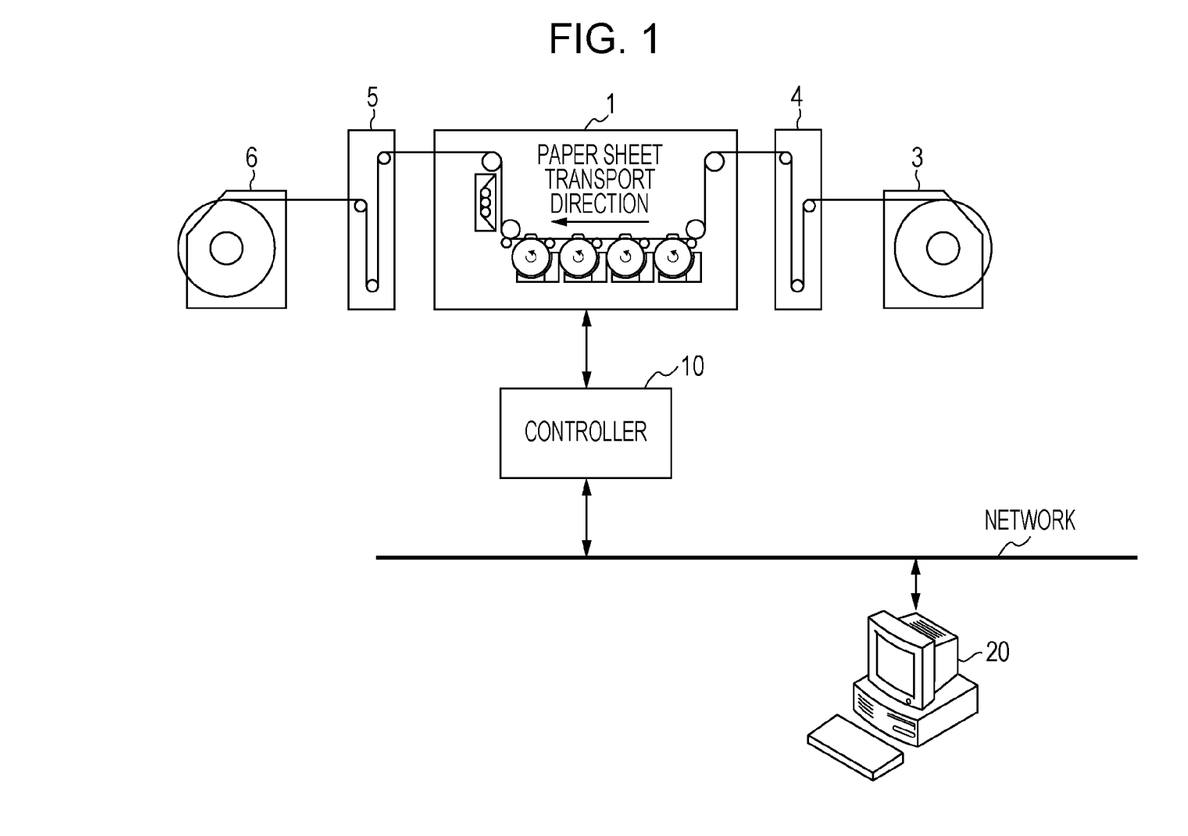
FIG. 1 illustrates an example of the configuration of an image forming system of a first exemplary embodiment.

FIG. 1 illustrates an example of the configuration of an image forming system of a first exemplary embodiment. The image forming system of the first exemplary embodiment includes a printer 1, a pre-process device 3, a buffer device 4, a buffer device 5, a post-process device 6, a controller 10, and a terminal apparatus 20. The controller 10 is connected to the terminal apparatus 20 in a wired or wireless communication mode.

The printer 1, controlled by the controller 10, prints image data on a printing paper sheet such as a roll of paper sheet.

The pre-process device 3 perform a pre-process including feeding a print paper sheet that is to be printed. The post-process device 6 performs a post-process, including taking up the printed paper sheet. The buffer devices 4 and 5 are arranged to maintain tension of the printing paper sheet between the pre-process device 3 and the printer 1 and between the printer 1 and the post-process device 6, respectively.

The terminal apparatus 20 generates print data, such as a print job, and then transmits the print data to the controller 10 via a network. The controller 10 functions as a printing controller apparatus configured to control the printing operation of the printer 1 in accordance with the print data transmitted from the terminal apparatus 20. The printer 1 outputs an image on the continuous-feed paper sheet in response to the print data under the control of the controller 10.

Figure 2:
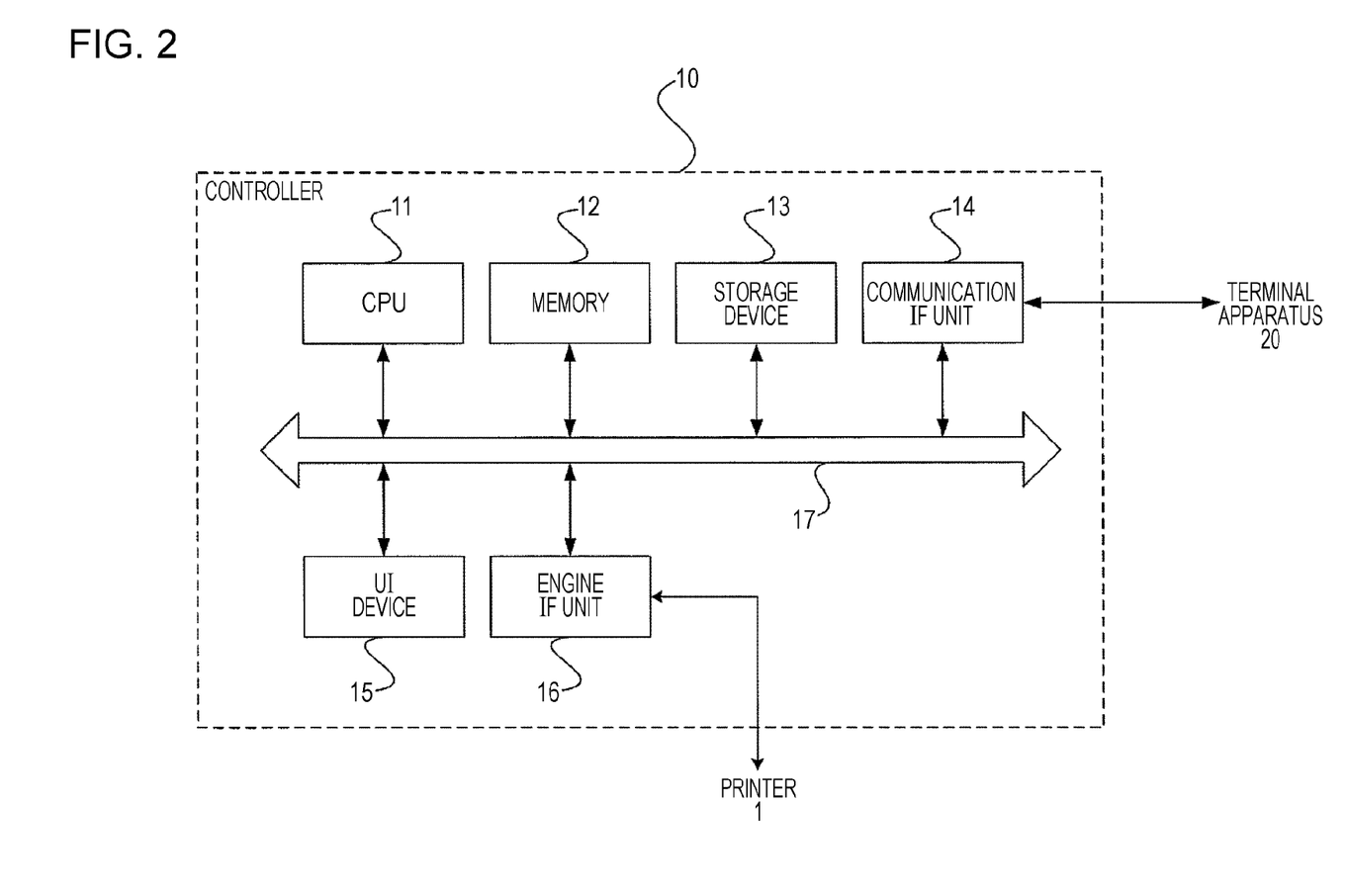
FIG. 2 is a functional block diagram illustrating the hardware configuration of a controller in the image forming system of the first exemplary embodiment.

The hardware configuration of the controller 10 in the image forming system of the first exemplary embodiment is described with reference to FIG. 2. Referring to FIG. 2, the controller 10 of the first exemplary embodiment includes a central processing unit (CPU) 11, a memory 12, a storage device 13, such as a hard disk drive (HDD), a communication interface (IF) unit 14 that transmits data to and receives data from the terminal apparatus 20 via the network, a user interface (UI) device 15 including a touchpanel or a liquid-crystal display, and an engine IF unit 16 that transmits data to and receives data from the printer 1. These elements are interconnected via a control bus 17.

The CPU 11 performs a predetermined process in accordance with a printing control program stored on the memory 12 or the storage device 13, thereby controlling the operation of the controller 10.

Figure 3:
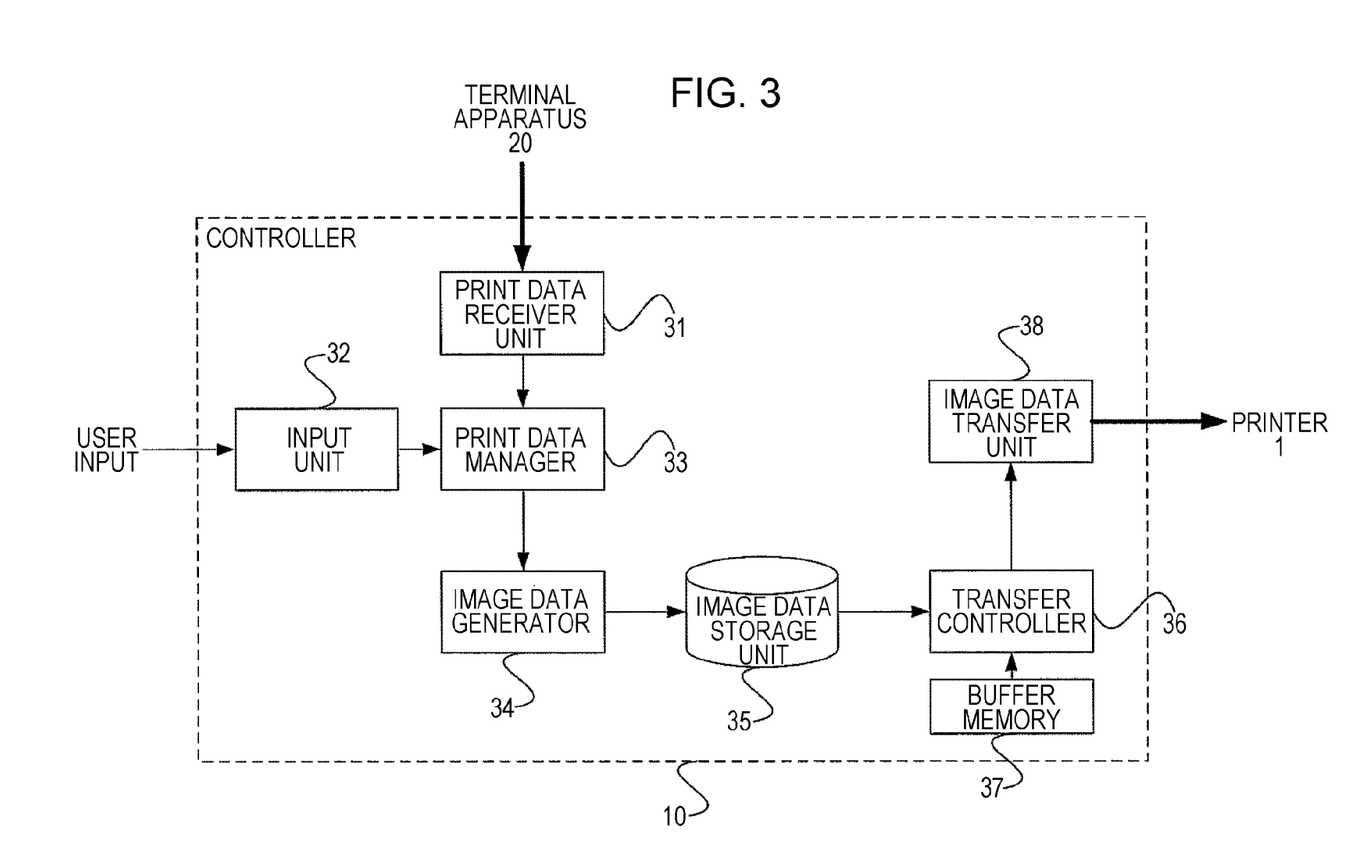
FIG. 3 is a functional block diagram of the controller in the image forming system of the first exemplary embodiment.

FIG. 3 is a functional block diagram of the controller 11 that is implemented by performing the printing control program.

Referring to FIG. 3, the controller 10 includes a print data receiver unit 31, an input unit 32, a print data manager 33, an image data generator 34, an image data storage unit 35, a transfer controller 36, a buffer memory 37, and an image data transfer unit 38.

The print data receiver unit 31 receives print data (print instruction) generated by the terminal apparatus 20 via the network.

The input unit 32 receives an input responsive to an operation of a user who operates the UI device 15.

Figure 4:
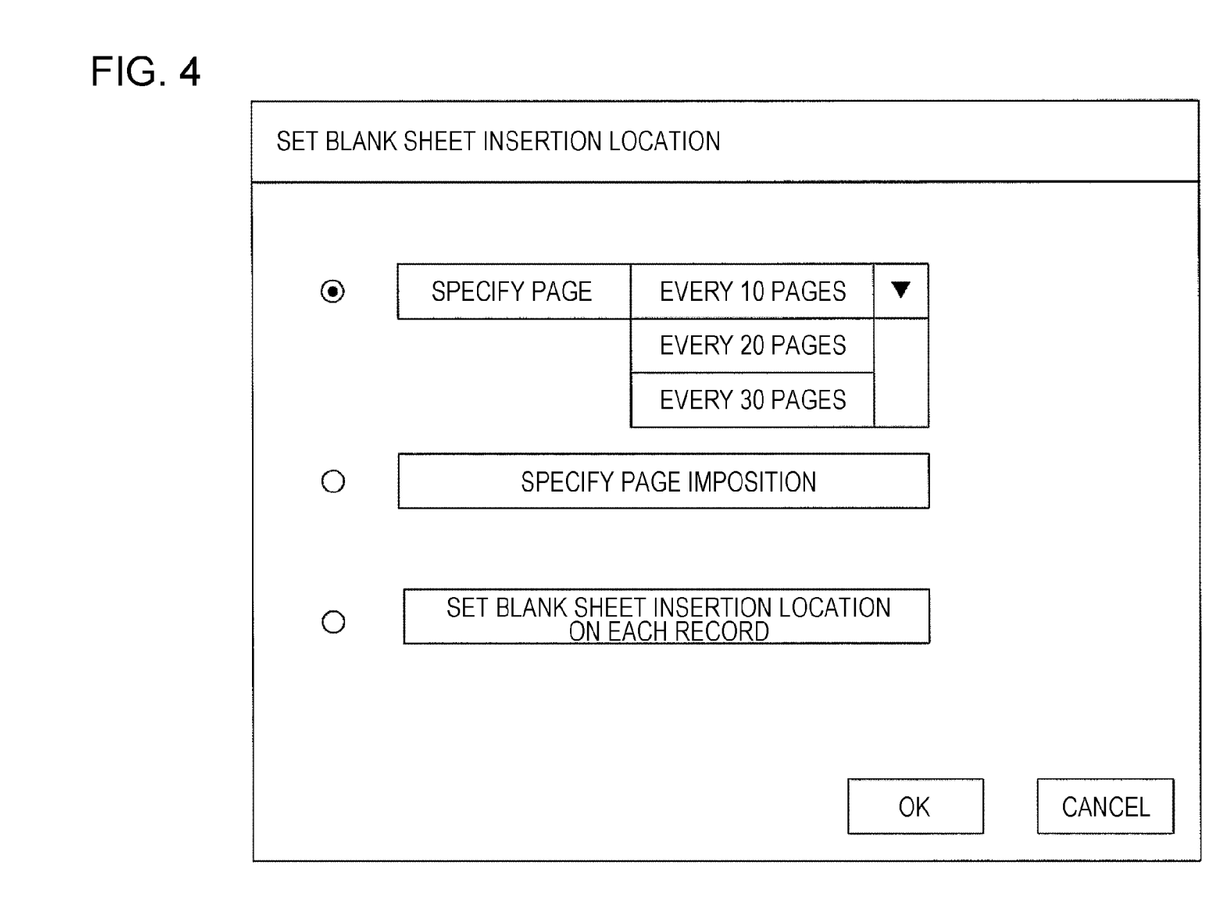
FIG. 4 illustrates an example of a blank sheet insertion location setting screen in the first exemplary embodiment.

The input unit 32 in the first exemplary embodiment displays on a display unit (not illustrated) a setting screen of a blank sheet insertion location as illustrated in FIG. 4, and receives information related to the blank sheet insertion location (delimitation location) in the print data input in response to an operation of the user.

As illustrated in FIG. 4, an operation "specify page" may be selected in the exemplary embodiment. The blank sheet insertion location may be determined every 10 pages, 20 pages, or 30 pages of the print data. If an operation "specify page imposition" is selected, page imposition printing is performed by combining image data of multiple pages into a single page. In this case, the blank sheet insertion location is set with the number of pages of the image data equal to a one-page-combined form output and handled as one set. An operation "set blank sheet insertion location on each record" on the screen at the blank sheet insertion location of FIG. 4 may be selected. This operation is described below.

The print data manager 33 sets the blank sheet insertion location in the print data in accordance with information input by the input unit 32. The print data manager 33 manages the set blank sheet insertion location and the print data in an associated state.

If the print data is constructed in a predetermined format, the print data manager 33 analyzes the print data and extracts a unit of the predetermined format.

Figure 5A:
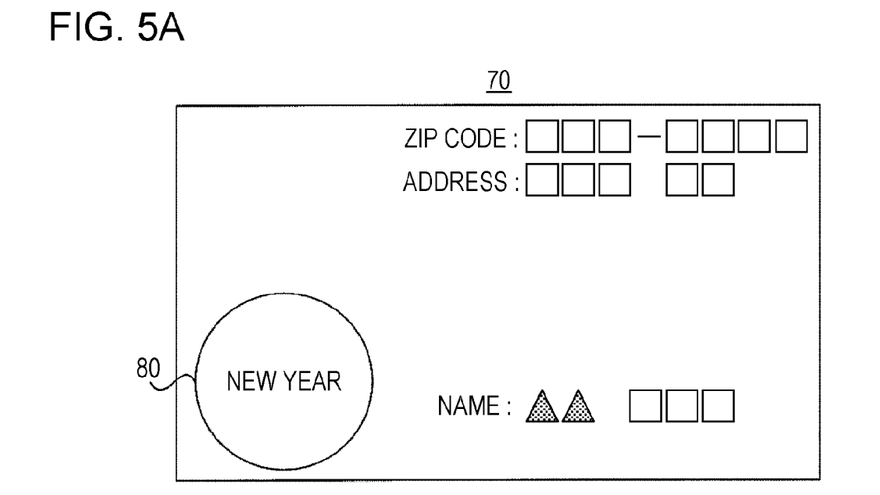
FIG. 5A and FIG. 5B illustrate examples of a format of the first exemplary embodiment.
Figure 5B:
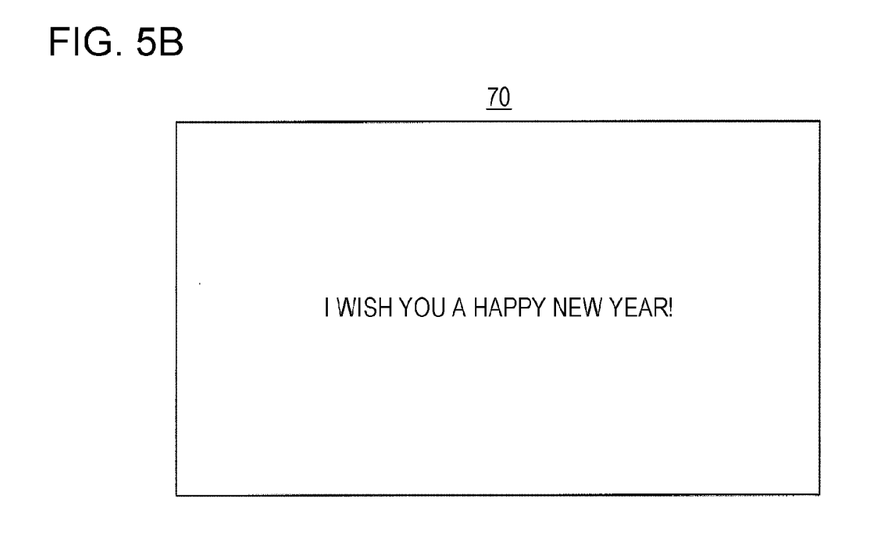

The print data received by the print data receiver unit 31 may be constructed in a format 70 (the predetermined format) as illustrated in FIG. 5A and FIG. 5B. A predetermined image is displayed at a predetermined location in the format 70 in the first exemplary embodiment. The format 70 may be used to generate the print data to modify part of information on the image. Referring to FIG. 5A and FIG. 5B, the locations of an object 80, zip code, address, and name are predetermined on page 1. Referring to FIG. 5B, a predetermined sentence is located on page 2 in the format 70. A single piece of print data is constructed in multiple formats 70 including different pieces of information at the locations of the zip code, address, and name on page 1. In the construction of the formats 70, page 1 and page 2 are combined as a single record (unit of format).

If the print data includes multiple formats 70, a record of formats 70 is every two pages. If the operation "set blank sheet insertion location on each record" is selected on the screen of the blank sheet insertion location of FIG. 4 with the print data constructed in the format 70, the print data manager 33 sets the blank sheet insertion location in the print data every 2 pages.

The image data generator 34 generates the image data though a rasterizing process in accordance with the print data received by the print data receiver unit 31.

The image data storage unit 35 saves the image data generated by the image data generator 34.

The transfer controller 36 successively reads the image data saved on the image data storage unit 35 and buffers the read image data on the buffer memory 37. The transfer controller 36 transmits the image data buffered on the buffer memory 37 to the image data transfer unit 38.

The buffer memory 37 temporarily buffers the image data successively read by the transfer controller 36 from the image data storage unit 35.

The image data transfer unit 38 transfers the image data received from the transfer controller 36 to the printer 1.

If an amount of the image data buffered on the buffer memory 37 is equal to or below a first threshold value, the transfer controller 36 controls the image data transfer unit 38 such that the blank sheet data is transferred to the printer 1 to insert the blank sheet data at the blank sheet insertion location set by the print data manager 33. If the blank sheet data is inserted in the blank sheet insertion location, the transfer controller 36 controls the image data transfer unit 38 such that the image data with information indicating the location of the inserted blank sheet data attached thereto is transferred to the printer 1 to be located subsequent to the last page of the print data. In the first exemplary embodiment, the transfer controller 36 controls the image data transfer unit 38 to transfer barcode image data as the information indicating the location of the inserted blank sheet data to the printer 1 in succession to the last page of the print data.

The buffer memory 37 of the first exemplary embodiment is described with reference to FIG. 6A through FIG. 6C.

Figure 6A:
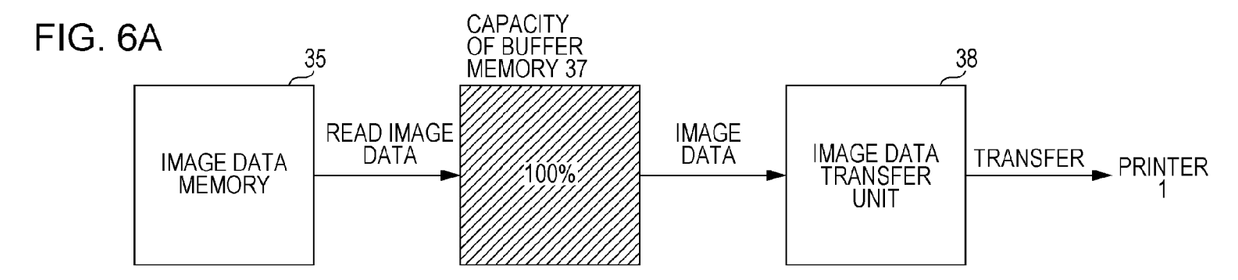
FIG. 6A through FIG. 6C illustrate examples of amounts of image data saved on a buffer memory of the first exemplary embodiment.
Figure 6B:
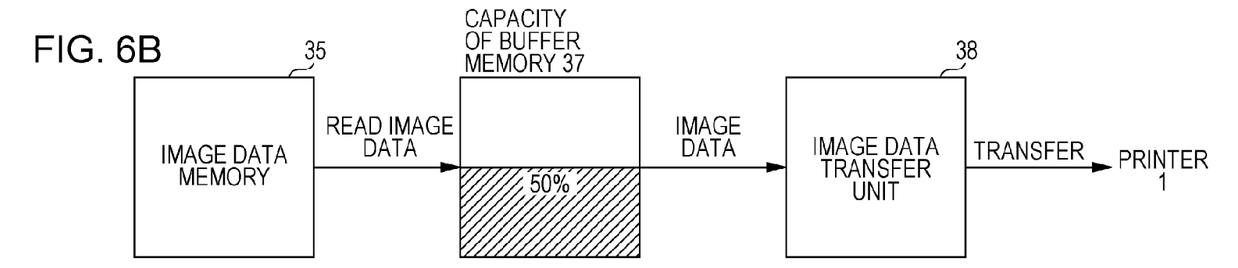
Figure 6C:
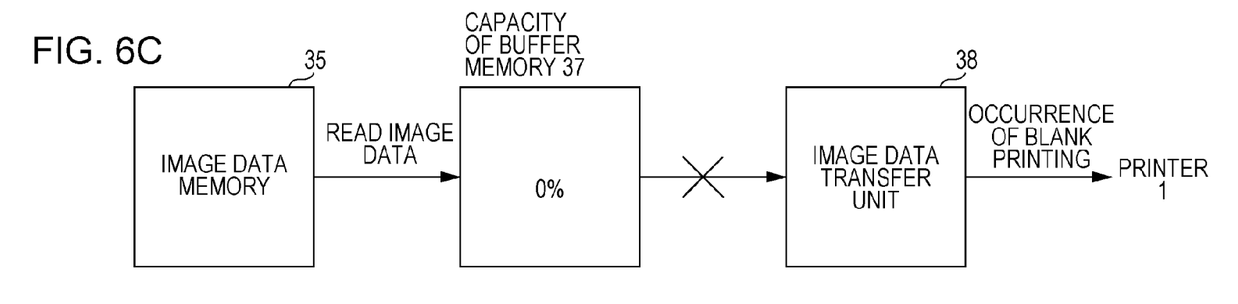

FIG. 6A through FIG. 6C illustrate examples of amounts of image data buffered on the buffer memory 37 of the first exemplary embodiment.

The buffer memory 37 in the first exemplary embodiment has a capacity capable of buffering the image data of 5 pages.

If the speed at which the transfer controller 36 reads the image data from the image data storage unit 35 to the buffer memory 37 is not lower than the speed at which the image data transfer unit 38 transfers the image data to the printer 1, an amount of image data buffered by the buffer memory 37 is normally 100 percent of the capacity of the buffer memory 37 as illustrated in FIG. 6A. If the speed at which the transfer controller 36 reads the image data from the image data storage unit 35 to the buffer memory 37 is equal to or higher than the speed at which the image data transfer unit 38 transfers the image data to the printer 1, the reading of the image data from the image data storage unit 35 is not performed until a memory space is available in the buffer memory 37. When a memory space is available, the buffer memory 37 is filled because the image data is read into the buffer memory 37.

A failure in the hard disk or other fault may lower the reading speed of the image data from the image data storage unit 35. The image data generator 34 may suffer from a slow generation of the image data. Such a problem causes the speed at which the transfer controller 36 reads the image data from the image data storage unit 35 to the buffer memory 37 to be lower than the speed at which the image data transfer unit 38 transfers the image data to the printer 1. In such a case, an amount of image data transferred by the image data transfer unit 38 is higher than an amount of image data read onto the buffer memory 37. Referring to FIG. 6B, the amount of image data buffered on the buffer memory 37 is lower than 100 percent of the capacity of the buffer memory 37.

If the speed at which the transfer controller 36 reads the image data from the image data storage unit 35 to the buffer memory 37 continuously remains lower than the speed at which the image data transfer unit 38 transfers the image data to the printer 1, the amount of image data buffered on the buffer memory 37 decreases. The buffer memory 37 then buffers no image data. In such a case, the image data transfer unit 38 becomes unable to transfer the image data to the printer 1 as illustrated in FIG. 6C.

If the image data transfer unit 38 becomes unable to transfer the image data to the printer 1, the printer 1 does not output the image data while the paper sheet is still transported. Blank printing thus occurs. A blank sheet is thus fed at an unintended location. For example, in the middle of page imposition printing, blank printing may occur prior to the completion of the outputting of multiple pieces of image data that are to be combined into a single page. In such a case, the image data forming the single page that is not fully prepared is output as printed matter, and reprinting is to be performed. As a result, print results prior to the blank printing may be entirely discarded and the reprinting is then performed. The continuous-feed sheet is uselessly consumed.

A specific example of inserting the blank sheet data at the blank sheet insertion location in the first exemplary embodiment is described below with reference to FIG. 7A through FIG. 8B.

Figure 7A:
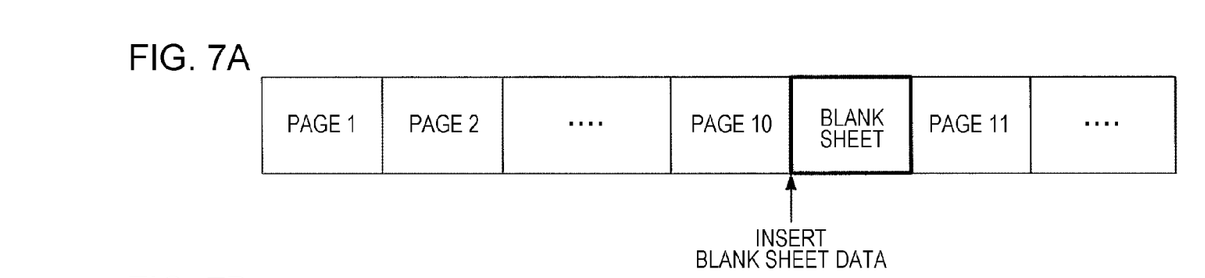
FIG. 7A through FIG. 7C illustrate examples of continuous-feed sheets in which blank sheet data is inserted at a blank sheet insertion location in the first exemplary embodiment.
Figure 7B:
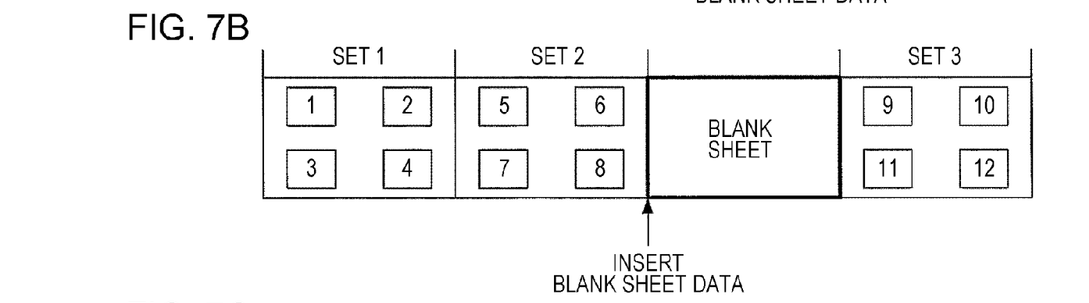
Figure 7C:
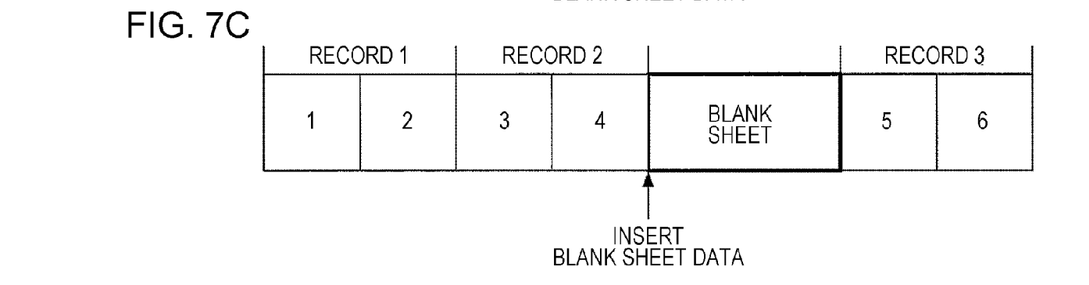

FIG. 7A through FIG. 7C illustrate examples of the continuous-feed paper sheet with the blank sheet data inserted at the blank sheet insertion location in the first exemplary embodiment. FIG. 7A illustrates the setting screen of the blank sheet insertion location with the operation "specify page" selected. FIG. 7B illustrates the setting screen of the blank sheet insertion location with the operation "specify page imposition" selected. FIG. 7C illustrates the setting screen of the blank sheet insertion location with the operation "set blank sheet insertion location on each record" selected.

The setting screen of the blank sheet insertion location with the operation "specify page" selected is described first.

If the operation "specify page" is selected on the setting screen of the blank sheet insertion location in the first exemplary embodiment, the blank sheet insertion location is set on each page specified on the setting screen of the blank sheet insertion location. The transfer controller 36 determines whether the amount of image data buffered on the buffer memory 37 is equal to or below the first threshold value. If the amount of image data buffered on the buffer memory 37 is equal to or below the first threshold value when the image data of the page of the blank sheet insertion location is transferred, the transfer controller 36 controls the image data transfer unit 38 to insert the blank sheet data at the blank sheet insertion location. In the first exemplary embodiment, the first threshold value is set to be the amount of image data buffered at the buffer memory 37 that is equal to 70 percent of the capacity of the buffer memory 37. The first threshold value may be set to be any appropriate value, however.

If the operation "specify page" is selected and "every 10 pages" are selected on the setting screen of the blank sheet insertion location, the print data manager 33 sets the blank sheet insertion location every 10 pages, namely, on page 11, page 21, . . . . Referring to FIG. 7A, the image data of page 10 of the print data is transferred. If the amount of image data buffered on the buffer memory 37 becomes 70 percent or below prior to the transfer of the image data of page 11, the transfer controller 36 controls the image data transfer unit 38 to insert the blank sheet data between page 10 and page 11.

The transfer controller 36 controls the image data transfer unit 38 such that the image data transfer unit 38 does not read the image data from the buffer memory 37 but transfers the blank sheet data until the amount of image data successively read and buffered on the buffer memory 37 increases to 100 percent of the capacity of the buffer memory 37. When the amount of image data buffered on the buffer memory 37 reaches 100 percent, the transfer controller 36 controls the image data transfer unit 38 to transfer the image data of page 11 buffered on the buffer memory 37 to the printer 1.

The terminal apparatus 20 operates as described below if the operation "specify page imposition" is selected on the setting screen of the blank sheet insertion location.

If the operation "specify page imposition" is selected on the setting screen of the blank sheet insertion location, the blank sheet insertion location is set up on each set in page imposition printing. The transfer controller 36 determines whether the amount of image data buffered on the buffer memory 37 becomes equal to or below 70 percent. If the amount of image data buffered on the buffer memory 37 becomes equal to or below 70 percent when the image data of the page of the blank sheet insertion location is transferred, the transfer controller 36 controls the image data transfer unit 38 to insert the blank sheet data at the blank sheet insertion location.

The page imposition printing may now be performed on the print data to combine the image data of 4 pages into a single page. If the operation "specify page imposition" is selected on the setting screen of the blank sheet insertion location, the print data manager 33 sets the blank sheet insertion location every 4 pages, for example, on page 5, page 9, . . . . The image data of set 2 of the print data may be transferred, and the amount of image data buffered on the buffer memory 37 may become equal to or below 70 percent prior to the transfer of the image data of page 9 as the first page of set 3. Referring to FIG. 7B, the transfer controller 36 controls the image data transfer unit 38 to insert the blank sheet data between set 2 and set 3.

The transfer controller 36 controls the image data transfer unit 38 to transfer the blank sheet data until the amount of image data successively read and buffered on the buffer memory 37 reaches 100 percent of the capacity of the buffer memory 37. When the amount of image data buffered on the buffer memory 37 reaches 100 percent of the capacity of the buffer memory 37, the transfer controller 36 controls the image data transfer unit 38 to transfer the image data of set 3 buffered on the buffer memory 37 to the printer 1.

The terminal apparatus 20 operates as described below if the operation "set blank sheet insertion location on each record" is selected on the setting screen of the blank sheet insertion location.

If the operation "set blank sheet insertion location on each record" is selected on the setting screen of the blank sheet insertion location in the first exemplary embodiment, the blank sheet insertion location is set on each record of the format 70. The transfer controller 36 determines whether the amount of image data buffered on the buffer memory 37 becomes equal to or below 70 percent. When the amount of image data buffered on the buffer memory 37 becomes equal to or below 70 percent with the image data of the page of the blank sheet insertion location transferred, the transfer controller 36 controls the image data transfer unit 38 to insert the blank sheet data at the set blank sheet insertion location.

If the operation "set blank sheet insertion location on each record" is selected on the setting screen of the blank sheet insertion location with record 1 of the format 70 being two pages, the print data manager 33 inserts the blank sheet insertion location every 2 pages, such as on page 3, page 5, . . . . The image data of page 4 as the last page of record 2 of the print data may be transferred and the amount of image data buffered on the buffer memory 37 may become equal to or below 70 percent prior to the transfer of the image data of page 5 as the first page of record 3. In that case, as illustrated in FIG. 7C, the transfer controller 36 controls the image data transfer unit 38 to insert the blank sheet data between record 2 and record 3.

The transfer controller 36 controls the image data transfer unit 38 to transfer the blank sheet data such that the amount of image data successively read and buffered on the buffer memory 37 reaches 100 percent of the capacity of the buffer memory 37. When the amount of image data buffered on the buffer memory 37 reaches 100 percent, the transfer controller 36 controls the image data transfer unit 38 such that the image data of record 3 buffered on the buffer memory 37 is transferred to the printer 1. If the amount of image data buffered on the buffer memory 37 exceeds the first threshold value during a period in which a blank sheet is intentionally inserted, the image data transfer unit 38 may resume the transferring of the image data from the buffer memory 37 to the printer 1.

Figure 8A:
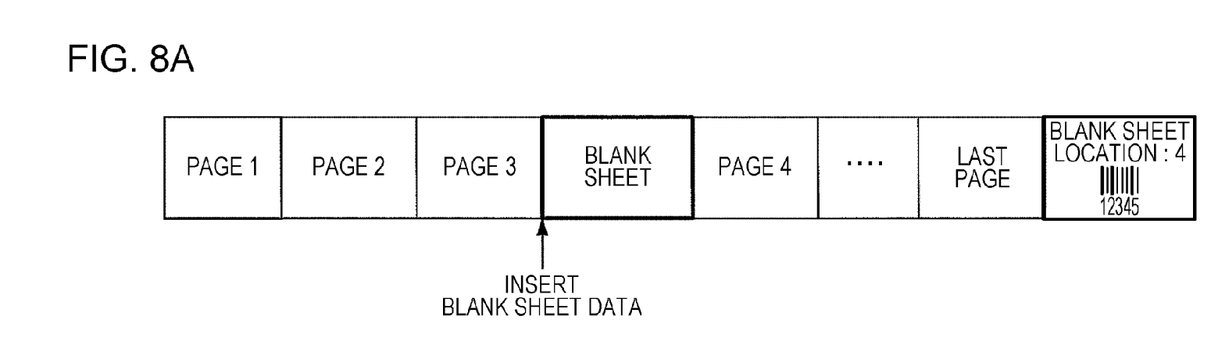
FIG. 8A and FIG. 8B illustrate examples of continuous-feed sheet in which the blank sheet data is inserted in the first and second exemplary embodiments.

When the blank sheet data is inserted, the transfer controller 36 controls the image data transfer unit 38 to transfer barcode image data as information indicating the location of the inserted blank sheet data to the printer 1 to be located subsequent to the last page of the print data as illustrated in FIG. 8A.

The blank sheet data may be inserted between page 3 and page 4 in the print data as illustrated in FIG. 8A. The transfer controller 36 then controls the image data transfer unit 38 such that the barcode image data indicating the blank sheet data inserted between page 3 and page 4 is transferred to the printer 1 to be located subsequent to the last of the print data. Also, as illustrated in FIG. 8A, the user may be visually assisted in recognizing that the blank sheet data has been inserted subsequent to page 3 by attaching a character string "blank sheet location: 4" together with the barcode image data.

The transfer controller 36 transmits, via communications, the information indicating the location of the inserted blank sheet data to an apparatus that is configured to perform a post-process operation, such as a cutting operation.

Figure 9:
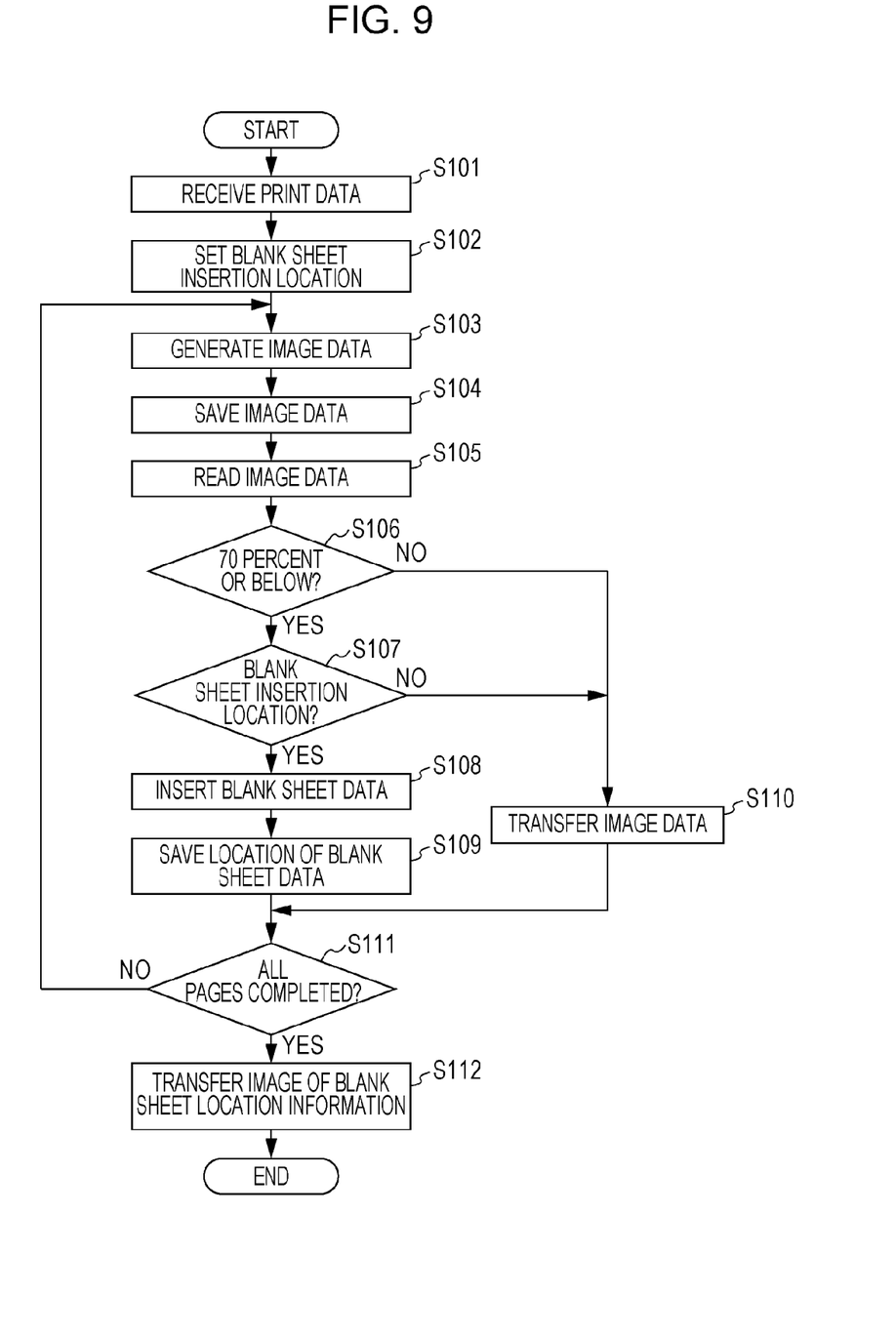
FIG. 9 is a flowchart illustrating the process flow of the controller of the first exemplary embodiment.

The process flow of the controller 10 of the first exemplary embodiment is described with reference to FIG. 9.

The print data receiver unit 31 receives the print data from the terminal apparatus 20 via the network (step S101).

The print data manager 33 sets the blank sheet insertion location based on the information input by the input unit 32 (step S102). If the print data is constructed in accordance with the format 70, the print data manager 33 extracts a record in the format 70.

The image data generator 34 generates the image data based on the print data (step S103).

The image data storage unit 35 saves the image data generated by the image data generator 34 (step S104).

The transfer controller 36 successively reads the image data saved on the image data storage unit 35 and buffers the image data onto the buffer memory 37 (step S105).

The transfer controller 36 determines whether the amount of image data buffered on the buffer memory 37 is equal to or below 70 percent of the capacity of the buffer memory 37 (step S106). If the amount of image data buffered on the buffer memory 37 is above 70 percent (no branch from step S106), processing proceeds to step S110.

If the amount of image data buffered on the buffer memory 37 is equal to or below 70 percent (yes branch from step S106), the transfer controller 36 determines whether the page of the image data to be transferred next is at the blank sheet insertion location (step S107). If the page is not at the blank sheet insertion location (no branch from step S107), processing proceeds to step S110.

If the page of the image data to be transferred next is at the blank sheet insertion location (yes branch from step S107), the transfer controller 36 control the image data transfer unit 38 such that the blank sheet data is transferred to the printer 1 (step S108).

The print data manager 33 saves the location where the transfer controller 36 has inserted the blank sheet data (step S109).

If the amount of image data buffered on the buffer memory 37 is above 70 percent (no branch from S106), or the page of the image data to be transferred next is not at the blank sheet insertion location (no branch from S107), the transfer controller 36 controls the image data transfer unit 38 such that the image data buffered on the buffer memory 37 is transferred to the printer 1 (step S110).

The transfer controller 36 determines whether the image data transferred is the last page of the print data (step S111). If the image data is not the last page (no branch from S111), processing returns to step S103 to repeat the process.

If the image data transferred is the last page of the print data (yes branch from S111), the transfer controller 36 instructs the image data generator 34 to generate the barcode image data indicating the location of the inserted blank sheet data based on the location where the blank sheet data saved on the print data manager 33 is inserted. The transfer controller 36 controls the image data transfer unit 38 such that the generated barcode image data is transferred to the printer 1 (step S112).

Second Exemplary Embodiment

A second exemplary embodiment is described below. In accordance with the first exemplary embodiment, the last page of the print data is followed by the transferred image data with the information indicating the location of the inserted blank sheet data. In the second exemplary embodiment, the transfer controller 36 controls the image data transfer unit 38 such that information indicating that the blank sheet data is inserted by the transfer controller 36 is added to blank sheet data to be inserted in the blank sheet insertion location and the information-added blank sheet data is transferred to the printer 1. The discussion of the configuration of the second exemplary embodiment similar to the configuration of the first exemplary embodiment is omitted herein.

Figure 8B:
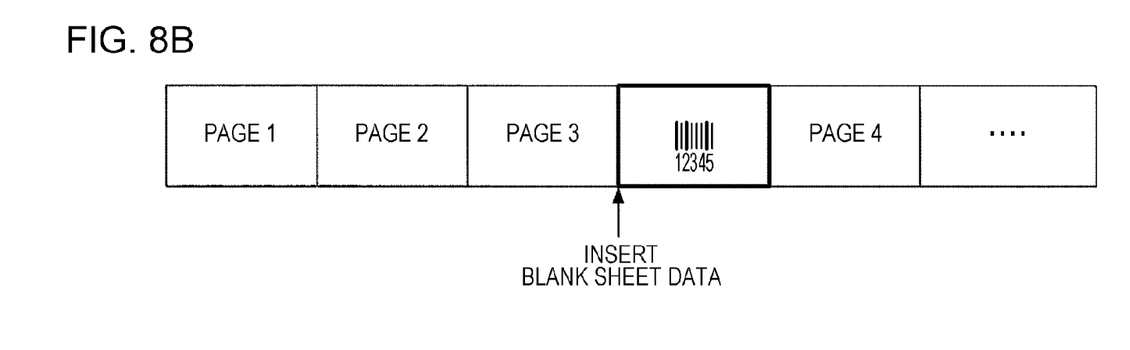

The blank sheet data may be inserted between page 3 and page 4 in the print data as illustrated in FIG. 8B. In such a case, the transfer controller 36 controls the image data transfer unit 38 such that the barcode image data indicating that the blank sheet data inserted between page 3 and page 4 is inserted by the transfer controller 36 is added to the blank sheet data and the resulting blank sheet data is then transferred to the printer 1. An apparatus (not illustrated) that performs the post-process, cutting the continuous-feed sheet, for example, may read the barcode image, and may then perform the post-process by differentiating the image based on the print data from the blank sheet inserted by the transfer controller 36.

Figure 10:
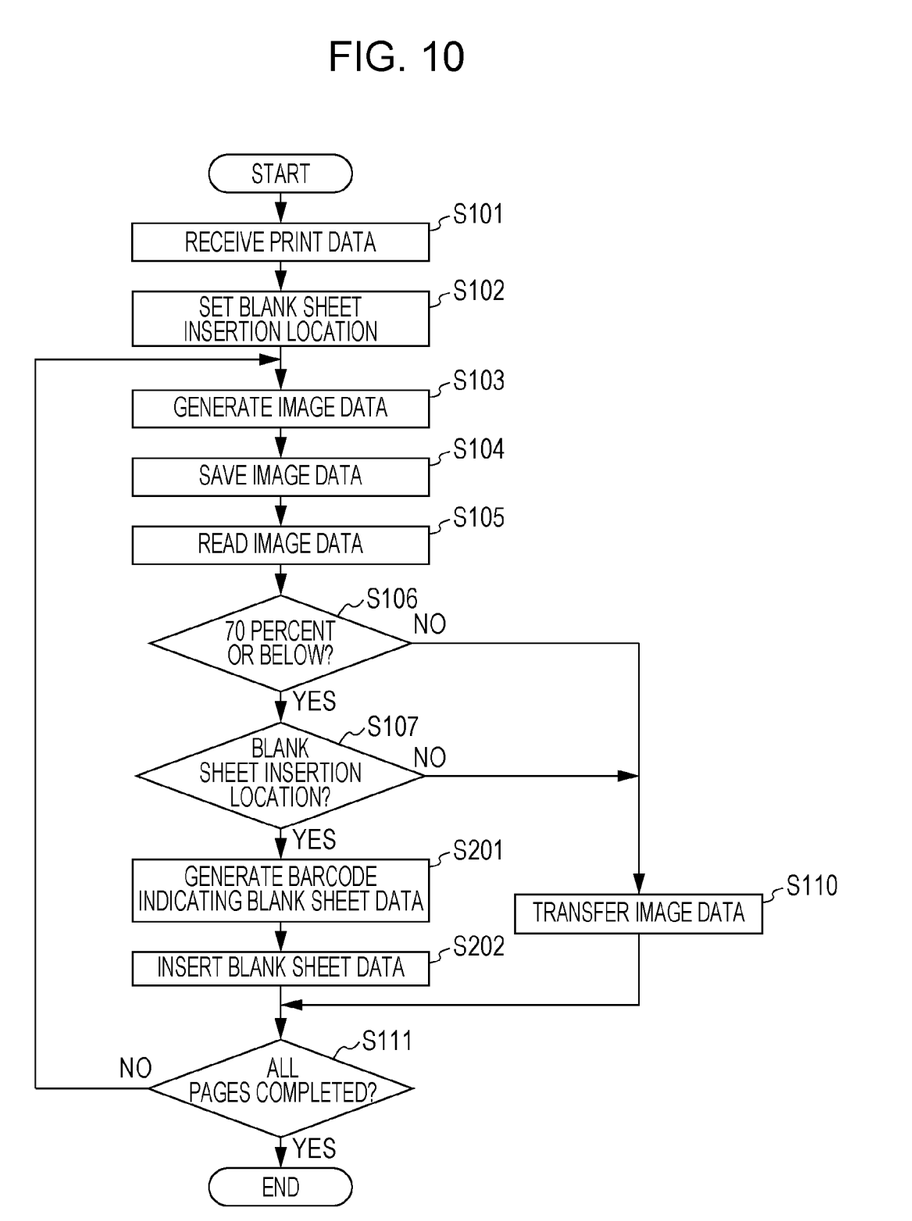
FIG. 10 is a flowchart illustrating the process flow of a controller in the second exemplary embodiment.

FIG. 10 is a flowchart illustrating the process flow of the controller 10 in the second exemplary embodiment. Steps similar to those illustrated in FIG. 9 are designated with the same step number and the discussion thereof is omitted.

If the amount of image data buffered on the buffer memory 37 is equal to or below 70 percent (yes branch from step S106), and the page is at the blank sheet insertion location (yes branch from step S107), the transfer controller 36 instructs the image data generator 34 to generate the barcode image data indicating the blank sheet data inserted by the transfer controller 36 (step S201).

The transfer controller 36 controls the image data transfer unit 38 such that the barcode image data generated by the image data generator 34 is transferred to the printer 1 (step S202).

Third Exemplary Embodiment

A third exemplary embodiment of the present invention is described. In accordance with the first and second exemplary embodiments, the blank sheet data is inserted at the blank sheet insertion location. Described with reference to the third exemplary embodiment is the case in which the blank sheet data is difficult to insert at the blank sheet insertion location. The discussion of the configuration similar to the configuration of the first exemplary embodiment is omitted herein.

In the third exemplary embodiment, the amount of image data buffered on the buffer memory 37 may become equal to or below the first threshold value, and it may be difficult to insert the blank sheet data at the blank sheet insertion location set by the print data manager 33. In such a case, the transfer controller 36 controls the image data transfer unit 38 such that the blank sheet data is transferred to the printer 1 after the image data of all colors forming the page is transferred.

If the amount of image data buffered on the buffer memory 37 becomes equal to or below 70 percent of the capacity of the buffer memory 37 as the first threshold value, and the image data to be transferred next is not at the page at the blank sheet insertion location, the transfer controller 36 controls the image data transfer unit 38 such that the image data transfer unit 38 transfers the blank sheet data to the printer 1, even if not to be located at the blank sheet insertion location, after transferring the image data of all colors, namely, cyan (C), magenta (M), yellow (Y), and black (K) of one page.

If the amount of image data buffered on the buffer memory 37 becomes equal to or below the first threshold value, and it is difficult to insert the blank sheet data at the blank sheet insertion location set by the print data manager 33, the transfer controller 36 controls the image data transfer unit 38 such that the blank sheet data is transferred to the printer 1 when the amount of image data buffered on the buffer memory 37 becomes equal to or below a second threshold value lower than the first threshold value.

The amount of image data buffered on the buffer memory 37 may become equal to or below 70 percent as the first threshold value, and the image data to be transferred next may not be at the page at the blank sheet insertion location. In such a case, the transfer controller 36 controls the image data transfer unit 38 such that the blank sheet data is transferred to the printer 1, even if not to be located at the blank sheet insertion location, when the amount of image data buffered on the buffer memory 37 becomes 30 percent of the capacity of the buffer memory 37. In the third embodiment, the second threshold value is 30 percent. Like the first threshold value, the second threshold value may be any appropriate value.

Figure 11:
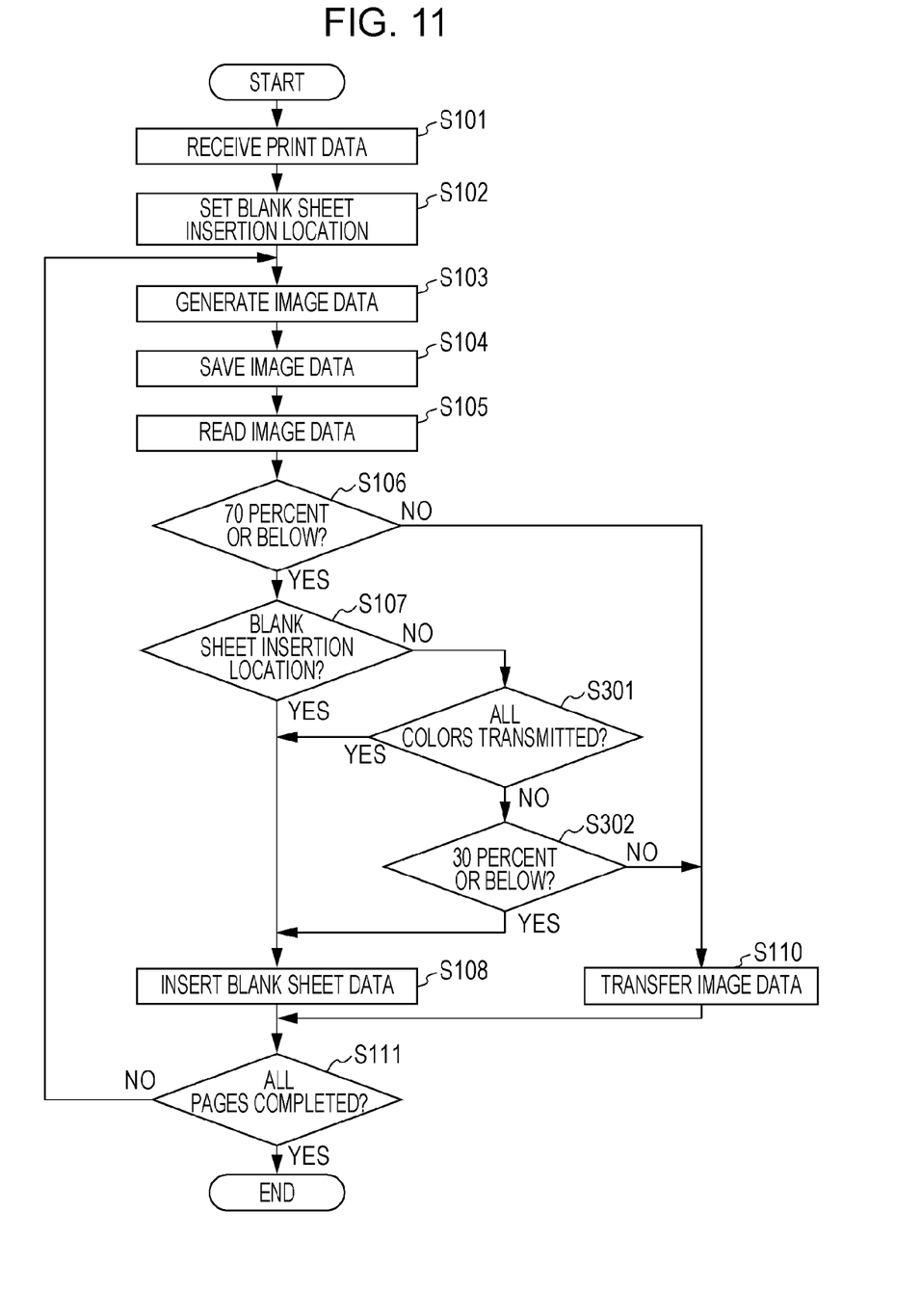
FIG. 11 is a flowchart illustrating the process flow of a controller of a third exemplary embodiment.

The process flow of the controller 10 of the third exemplary embodiment is described with reference to a flowchart of FIG. 11. Operations similar to those of the first exemplary embodiment are designated with the same step numbers and the discussion thereof is omitted.

If the amount of image data buffered on the buffer memory 37 becomes equal to or below 70 percent of the capacity of the buffer memory 37 (yes branch from step S106), and the page of the image data to be transferred next is not at the blank sheet insertion location (no branch from S107), the transfer controller 36 determines whether the image data transfer unit 38 has transferred the image data of all colors C, M, Y, and K of one page (step S301). If the image data transfer unit 38 has transferred the image data of all colors C, M, Y, and K of one page (yes branch from step S301), the transfer controller 36 controls the image data transfer unit 38 such that the blank sheet data is transferred to the printer 1, even if not to be located at the blank sheet insertion location (step S108).

If the image data transfer unit 38 has not transferred the image data of all colors C, M, Y, and K of one page (no branch from step S301), the transfer controller 36 determines whether the amount of image data buffered on the buffer memory 37 is equal to or below 30 percent of the capacity of the buffer memory 37 (step S302). If the amount of image data buffered on the buffer memory 37 is above 30 percent (no branch from S302), processing proceeds to step S110.

If the amount of image data buffered on the buffer memory 37 is equal to or below 30 percent of the capacity of the buffer memory 37 (yes branch from step S302), the transfer controller 36 controls the image data transfer unit 38 such that the blank sheet data is transferred to the printer 1, even if not to be located at the blank sheet insertion location (step S108).

In the first through third exemplary embodiments, the first threshold value and the second threshold value are respectively set to be 70 percent and 30 percent. Each of the first threshold value and the second threshold value may be set depending on the printing speed of the printer 1, the reading speed of the image data onto the buffer memory 37, or the generation speed of the image data of the image data generator 34, or other factors.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing control apparatus comprising:
  a processor configured to implement:
    a setting unit configured to set a location of a delimitation in a print instruction;
    a buffer unit configured to buffer image data generated in response to the print instruction; and
    a transfer unit configured to transfer the image data buffered by the buffer unit to a printer configured to print on a continuous-feed paper sheet,
  wherein the transfer unit is further configured to insert blank sheet data at the location of the delimitation set by the setting unit when an amount of the image data buffered by the buffer unit becomes equal to or below a first threshold value and to transfer the image data to the printer, and
  wherein in a case where the amount of the image data buffered by the buffer unit is equal to or below the first threshold value, and the blank sheet data is not insertable at the location of the delimitation set by the setting unit, the transfer unit transfers the blank sheet data to the printer after the image data of all colors forming a page is transferred.

2. The printing control apparatus according to claim 1, further comprising an input unit configured to receive an input from a user,
wherein the setting unit is further configured to set the location of the delimitation in accordance with information input by the input unit.

3. The printing control apparatus according to claim 2, wherein the transfer unit is further configured to transfer the image data with information indicating an insertion location of the blank sheet data attached thereto to the printer to be located subsequent to a last page of the print instruction.

4. The printing control apparatus according to claim 3, wherein the transfer unit is further configured to attach, to the blank sheet data, information indicating that the blank sheet data is inserted by the controller, before transferring the blank sheet data to the printer.

5. The printing control apparatus according to claim 2, wherein the transfer unit is further configured to transfer information indicating an insertion location of the blank sheet data is transmitted to an apparatus configured to perform a post-process to the continuous-feed paper sheet.

6. The printing control apparatus according to claim 2, wherein the transfer unit is further configured to attach, to the blank sheet data, information indicating that the blank sheet data is inserted by the controller, before transferring the blank sheet data to the printer.

7. The printing control apparatus according to claim 1, wherein in case that the print instruction is constructed in a predetermined format, the setting unit is further configured to extract a unit of the format from the print instruction and to set the location of the delimitation on a per unit basis of the format.

8. The printing control apparatus according to claim 7, wherein the transfer unit is further configured to transfer the image data with information indicating an insertion location of the blank sheet data attached thereto to the printer to be located subsequent to a last page of the print instruction.

9. The printing control apparatus according to claim 8, wherein the transfer unit is further configured to attach, to the blank sheet data, information indicating that the blank sheet data is inserted by the controller, before transferring the blank sheet data to the printer.

10. The printing control apparatus according to claim 7, wherein the transfer unit is further configured to attach, to the blank sheet data, information indicating that the blank sheet data is inserted by the controller, before transferring the blank sheet data to the printer.

11. The printing control apparatus according to claim 1, wherein the transfer unit is further configured to transfer the image data with information indicating an insertion location of the blank sheet data attached thereto to the printer to be located subsequent to a last page of the print instruction.

12. The printing control apparatus according to claim 11, wherein the transfer unit is further configured to attach, to the blank sheet data, information indicating that the blank sheet data is inserted by the controller, before transferring the blank sheet data to the printer.

13. The printing control apparatus according to claim 1, wherein the transfer unit is further configured to attach, to the blank sheet data, information indicating that the blank sheet data is inserted by the controller, before transferring the blank sheet data to the printer.

14. The printing control apparatus according to claim 1, wherein the transfer unit if further configured to transfer information indicating an insertion location of the blank sheet data is transmitted to an apparatus configured to perform a post-process to the continuous-feed paper sheet.

15. The printing control apparatus according to claim 1, wherein in a case where the amount of the image data buffered by the buffer unit is equal to or below the first threshold value, and the blank sheet data is not insertable at the location of the delimitation set by the setting unit, the transfer unit transfers the blank sheet data to the printer when the amount of the image data buffered on the buffer unit is equal to or below a second threshold value that is less than the first threshold value.

16. An image forming system, comprising:
a processor configured to implement:
a printer configured to print to a continuous-feed paper sheet;
a setting unit configured to set a location of a delimitation in a print instruction;
a generator unit configured to generate image data in response to the print instruction;
a storage unit configured to save the image data;
a buffer unit configured to successively read the image data saved by the storage unit and to temporarily buffer the read image data;
a transfer unit configured to transfer the image data buffered by the buffer unit to the printer; and
a controller configured to control the transfer unit to transfer blank sheet data to the printer such that the blank sheet data is inserted at the location of the delimitation set by the setting unit when an amount of the image data buffered by the buffer unit becomes equal to or below a threshold value,
wherein in a case where the amount of the image data buffered by the buffer unit is equal to or below the first threshold value, and the blank sheet data is not insertable at the location of the delimitation set by the setting unit, the transfer unit transfers the blank sheet data to the printer after the image data of all colors forming a page is transferred.

17. A printing control method, comprising:
setting a location of a delimitation in a print instruction;
buffering image data generated in response to the print instruction; and
transferring the buffered image data to a printer that prints on a continuous-feed paper sheet;
transferring blank sheet data to the printer such that the blank sheet data is inserted at the set location of the delimitation when an amount of the buffered image data becomes equal to or below a threshold value,
wherein in a case where the amount of the image data buffered by the buffer unit is equal to or below the first threshold value, and the blank sheet data is not insertable at the set location of the delimitation, transferring the blank sheet data to the printer after the image data of all colors forming a page is transferred.

18. A non-transitory computer readable medium storing a program causing a computer to execute a process for controlling printing, the process comprising:
setting a location of a delimitation in a print instruction;
buffering image data generated in response to the print instruction;
transferring the buffered image data to a printer that prints on a continuous-feed paper sheet;
transferring blank sheet data to the printer such that the blank sheet data is inserted at the set location of the delimitation when an amount of the buffered image data becomes equal to or below a threshold value, wherein in a case where the amount of the image data buffered is equal to or below the first threshold value, and the blank sheet data is not insertable at the set location of the delimitation, transferring the blank sheet data to the printer after the image data of all colors forming a page is transferred.

* * * * *